US008625652B2

(12) United States Patent
Chen (10) Patent No.: US 8,625,652 B2
(45) Date of Patent: Jan. 7, 2014

(54) COLLISION-FREE GROUP HOPPING IN A WIRELESS COMMUNICATION SYSTEM

(75) Inventor: Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 925 days.

(21) Appl. No.: 11/971,053

(22) Filed: Jan. 8, 2008

(65) Prior Publication Data
US 2008/0212514 A1 Sep. 4, 2008

Related U.S. Application Data

(60) Provisional application No. 60/884,603, filed on Jan. 11, 2007.

(51) Int. Cl.
*H04B 1/00* (2006.01)
(52) U.S. Cl.
USPC .......................................... 375/130
(58) Field of Classification Search
None
See application file for complete search history.

(56) References Cited

U.S. PATENT DOCUMENTS

| | | | | |
|---|---|---|---|---|
| 5,515,369 | A * | 5/1996 | Flammer et al. | 370/480 |
| 5,875,184 | A * | 2/1999 | Altvater et al. | 370/330 |
| 5,887,022 | A | 3/1999 | Lee et al. | |
| 6,741,554 | B2 | 5/2004 | D'Amico et al. | |
| 6,760,587 | B2 * | 7/2004 | Holtzman et al. | 455/436 |
| 6,795,413 | B1 | 9/2004 | Uhlik | |
| 7,027,782 | B2 * | 4/2006 | Moon et al. | 455/102 |
| 7,181,666 | B2 | 2/2007 | Grob et al. | |
| 7,277,411 | B2 * | 10/2007 | Shneyour et al. | 370/337 |
| 7,345,998 | B2 * | 3/2008 | Cregg et al. | 370/230 |
| 7,362,733 | B2 * | 4/2008 | Kim et al. | 370/335 |
| 7,711,028 | B2 * | 5/2010 | Saidi | 375/132 |
| 8,400,998 | B2 * | 3/2013 | Kuchibhotla et al. | 370/348 |
| 2002/0071402 | A1 * | 6/2002 | Kockmann et al. | 370/330 |
| 2002/0109607 | A1 | 8/2002 | Cumeralto | |
| 2003/0108008 | A1 | 6/2003 | Agrawal et al. | |

(Continued)

FOREIGN PATENT DOCUMENTS

| EP | 0771092 A1 | 5/1997 |
|---|---|---|
| JP | 2004146883 A | 5/2004 |

(Continued)

OTHER PUBLICATIONS

International Search Report—PCT/US08/050854—International Search Authority, European Patent Office, Jun. 2, 2008

(Continued)

*Primary Examiner* — Fan Ng
(74) *Attorney, Agent, or Firm* — Peng Zhu (57) ABSTRACT

Techniques for supporting data transmission with little or no control overhead are described. In an aspect, data may be sent based on a hybrid scheme that utilizes a combination of group hopping for transmissions of new packets and static grouping for retransmissions of pending packets. For the hybrid scheme, a user equipment (UE) may be assigned different resource blocks in different transmission intervals based on a hopping pattern. The first transmission of new packets may be sent on resource blocks determined based on the hopping pattern. Retransmissions of each packet, if any, may be sent on the resource block used for the first transmission of the packet. The UE may perform blind decoding to recover packets sent to the UE. In another aspect, semi-static group assignment may be used, and the UE may be assigned a group of resource blocks that may change periodically or based on trigger events.

34 Claims, 9 Drawing Sheets

(56) References Cited

U.S. PATENT DOCUMENTS

| | | | |
|---|---|---|---|
| 2003/0185163 A1* | 10/2003 | Bertonis et al. | 370/315 |
| 2004/0037251 A1* | 2/2004 | Shneyour et al. | 370/336 |
| 2004/0125776 A1* | 7/2004 | Haugli et al. | 370/338 |
| 2005/0226198 A1 | 10/2005 | Barak et al. | |
| 2006/0018347 A1 | 1/2006 | Agrawal | |
| 2006/0256819 A1 | 11/2006 | Lum et al. | |
| 2007/0030883 A1* | 2/2007 | Saidi | 375/133 |
| 2007/0076666 A1* | 4/2007 | Riveiro et al. | 370/335 |
| 2007/0230390 A1* | 10/2007 | Takatani et al. | 370/315 |
| 2008/0101319 A1* | 5/2008 | Rao | 370/342 |
| 2008/0187027 A1* | 8/2008 | Malladi | 375/135 |
| 2009/0316758 A1* | 12/2009 | Ahn et al. | 375/135 |
| 2010/0195600 A1* | 8/2010 | Gorokhov et al. | 370/329 |

FOREIGN PATENT DOCUMENTS

| | | |
|---|---|---|
| JP | 2004364047 A | 12/2004 |
| JP | 2006173891 A | 6/2006 |
| JP | 2006525754 A | 11/2006 |
| JP | 2008541607 A | 11/2008 |
| RU | 2263399 C2 | 10/2005 |
| RU | 2295833 | 3/2007 |
| RU | 2300175 | 5/2007 |
| WO | WO0150795 | 7/2001 |
| WO | WO0180477 | 10/2001 |
| WO | WO03032564 | 4/2003 |
| WO | WO2004098098 | 11/2004 |
| WO | WO2006020021 | 2/2006 |
| WO | WO2006121376 | 11/2006 |

OTHER PUBLICATIONS

Fitton, M P, et al.: "Propogation Aspects of Frequency-Hopping Spread Spectra" IEE Proceedings: Microwaves, Antennas, and Propogation, IEE, Stevenage, Herts, GB, vol. 145, No. 3, Jun. 11, 1998, pp. 249-255.

Written Opinion—PCT/US2008/050854, Internation Searching Authority—European Patent Office—Jun. 2, 2008.

Taiwan Search Report—TW097101194—TIPO—Jul. 29, 2012.

* cited by examiner

COLLISION-FREE GROUP HOPPING IN A WIRELESS COMMUNICATION SYSTEM

The present application claims priority to provisional U.S. Application Ser. No. 60/884,603, entitled "A METHOD AND APPARATUS FOR COLLISION-FREE GROUP HOPPING IN SDCCH-LESS VOIP OPERATIONS FOR OFDMA SYSTEMS," filed Jan. 11, 2007, assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). Each UE may communicate with one or more base stations via transmissions on the downlink and uplink. The downlink (or forward link) refers to the communication link from the base stations to the UEs, and the uplink (or reverse link) refers to the communication link from the UEs to the base stations.

A base station may periodically or sporadically transmit data to a UE. The base station may send control information on a control channel to inform the UE of an impending data transmission. Control information is also commonly referred to as signaling. The control information may be useful in assisting the UE to receive the data transmission. However, valuable system resources may be consumed to send the control information, which may then reduce system capacity for data transmission. There is therefore a need in the art for techniques to support data transmission with little or no overhead for control information.

SUMMARY

Techniques for supporting data transmission with little or no control overhead in a wireless communication system are described herein. To avoid sending control information with each data transmission, a UE may be preconfigured with certain parameters such as (i) a set of modulation and coding schemes (MCSs) that might be used for packets sent to the UE and (ii) a group of resource blocks that might be used to send packets to the UE. A resource block may correspond to any type of resources (e.g., time, frequency, code, etc.) used to send data. The UE may perform blind decoding on transmissions received via the group of resource blocks based on the set of MCSs to detect for possible packets sent to the UE. Blind decoding refers to decoding based on assumed parameters and possibly without knowledge of whether or not a transmission is actually sent.

In an aspect, data may be sent based on a hybrid scheme that utilizes a combination of group hopping for transmissions of new packets and static grouping for retransmissions of pending packets. For this scheme, the UE may be assigned different resource blocks in different transmission intervals based on a hopping pattern. The first transmission of new packets may be sent on resource blocks determined based on the hopping pattern. Retransmissions of each packet, if any, may be sent on the resource block used for the first transmission of the packet. This scheme may provide certain advantages, as described below.

In another aspect, semi-static group assignment may be used, and the UE may be assigned a group of resource blocks that may change periodically or based on trigger events. A new assignment may be triggered based on loading on the currently assigned resource block(s), data requirements of the UE, etc. The UE may be assigned different numbers of resource blocks in different time intervals based on data requirements. The UE may also be associated with different groups of UEs in different time intervals to improve statistical multiplexing gain.

Various aspects and features of the disclosure are described in further detail below:

DETAILED DESCRIPTION

Figure 1:
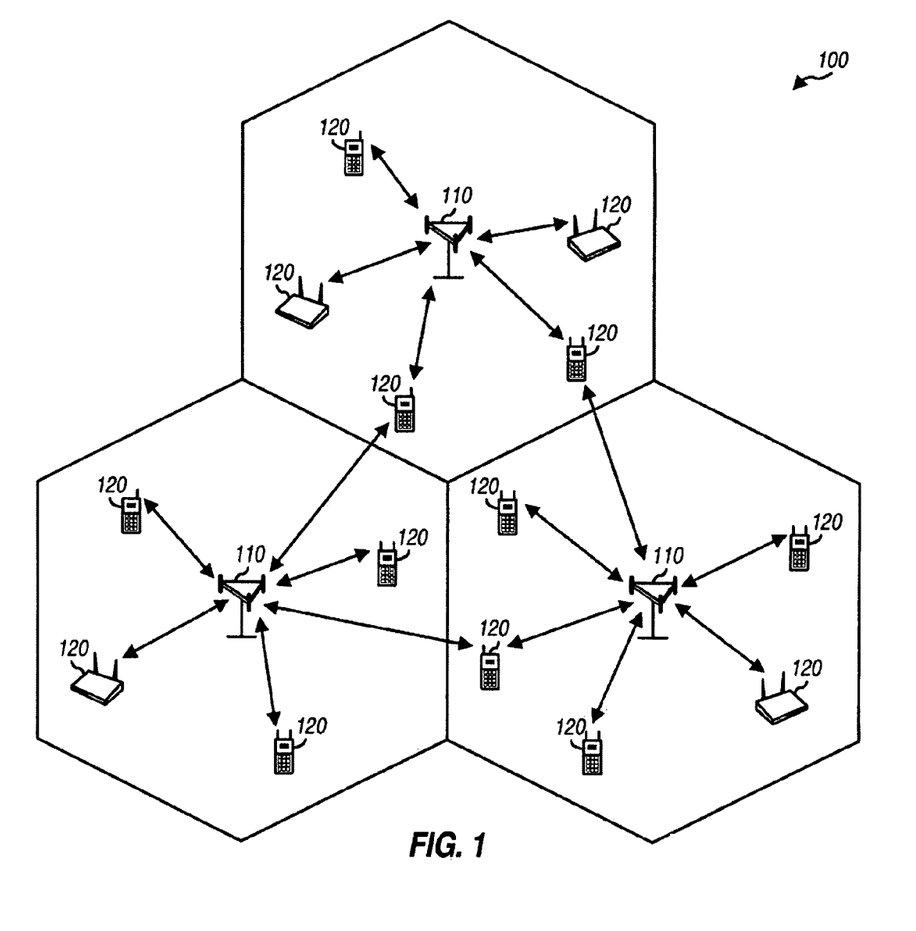
FIG. 1 shows a wireless communication system.

FIG. 1 shows a wireless multiple-access communication system 100 with multiple Node Bs 110. A Node B may be a fixed station that communicates with the UEs and may also be referred to as an evolved Node B (eNB), a base station, an access point, etc. Each Node B 110 may provide communication coverage for a particular geographic area. UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11(Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art.

For clarity, certain aspects of the techniques are described below for LTE, and LTE terminology is used in much of the description below. For LTE, a Node B may send control information, on a Physical Downlink Control Channel (PDCCH), which may also be referred to as a Shared Downlink Control Channel (SDCCH). The Node B may send data on a Physical Downlink Shared Channel (PDSCH). A UE may send feedback information on a Physical Uplink Control Channel (PUCCH).

The techniques described herein may be used for data transmission on the downlink as well as the uplink. For clarity, certain aspects of the techniques are described below for data transmission on the downlink.

The system may support HARQ. For HARQ on the downlink, a Node B may send a first transmission of a packet to a UE and may thereafter send one or more additional transmissions (or retransmissions) until the packet is decoded correctly by the UE, or the maximum number of transmissions has been sent, or some other termination condition is encountered. HARQ may improve reliability of data transmission.

Figure 2:
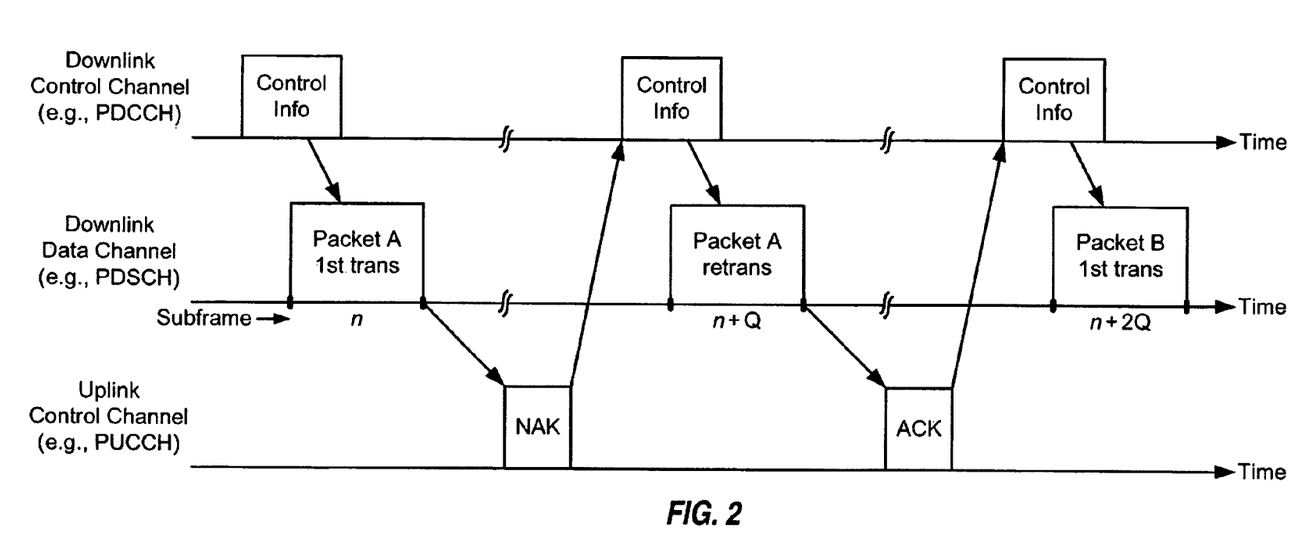
FIG. 2 shows data transmission with hybrid automatic retransmission (HARQ).

FIG. 2 shows data transmission on the downlink with HARQ. A Node B may have data to send to a UE, e.g., for a Voice-over-Internet Protocol (VoIP) call. The Node B may process packet A and send a first transmission of packet A on the PDSCH in subframe n. A subframe may be 1 millisecond (ms) or some other time duration. The Node B may also send control information on the PDCCH slightly ahead of or concurrent with the first transmission of packet A. The UE may receive the control information and recognize that a new packet is being sent to the UE. The UE may then receive the first transmission of packet A, decode packet A in error based on the first transmission, and send a negative acknowledgement (NAK) on the PUCCH.

The Node B may receive the NAK from the UE and may send a second transmission (or retransmission) of packet. A in subframe n+Q along with control information. The UE may then receive the control information and recognize that another transmission of packet A is being sent. The UE may receive the second transmission, decode packet A correctly based upon the first and second transmissions, and send an acknowledgement (ACK). The Node B may receive the ACK from the UE and may process and send the first transmission of the next packet B in similar manner in subframe n+2Q.

For HARQ, up to T transmissions may be sent for a packet until the packet is decoded correctly, where T may be dependent on the system and may be configurable. The second through last transmissions of a packet may be referred to as retransmissions. A packet that has not been decoded correctly may be referred to as a pending packet For synchronous HARQ, all transmissions of a packet may be sent on one interlace, which may include subframes spaced apart by Q subframes, as shown in FIG. 2. Thus, if a packet is decoded in error, then another transmission of the packet may be sent Q subframes after a preceding transmission. A new packet may be sent whenever resources are available. A retransmission of a pending packet may have higher priority than a first transmission of a new packet.

As shown in FIG. 2, the Node B may send control information on the PDCCH to assist the UE receive and decode a packet sent on the PDSCH. The control information may indicate (i) whether a first transmission or a retransmission is being sent for the packet, (ii) the code rate, modulation scheme, and size of the packet, and (iii) the resources on which the packet is sent. The control information may be useful but may consume a relatively large amount of resources. For example, capacity for VoIP may be improved by 25% if the control information is not sent.

The system may support PDCCH-less operation in order to improve capacity. For PDCCH-less operation, a UE may be preconfigured with certain parameters such as a set of modulation and coding schemes (MCSs) that might be used for packets sent to the UE, a group of resource blocks that might be used to send packets to the UE, etc. The UE may perform blind decoding on transmissions received via the group of resource blocks based on the set of MCSs to detect for possible packets sent to the UE. Transmission of control information may be avoided with PDCCH-less operation, and capacity may improve as a result.

A UE may be assigned a subset of all resource blocks for PDCCH-less operation in order to reduce decoding complexity at the UE. For LTE, a resource block may be (i) a physical resource block composed of 12 subcarriers in either 6 or 7 symbol periods or (ii) a virtual resource block that may be mapped to a physical resource block based on a known mapping. A resource block may correspond to other types of resources such as time, frequency, code, etc., in other systems. In any case, the assignment of only a fraction (e.g., one) of the total available resource blocks is referred to as grouping. A UE may be assigned resource blocks based on various grouping schemes for PDCCH-less operation.

Figure 3:
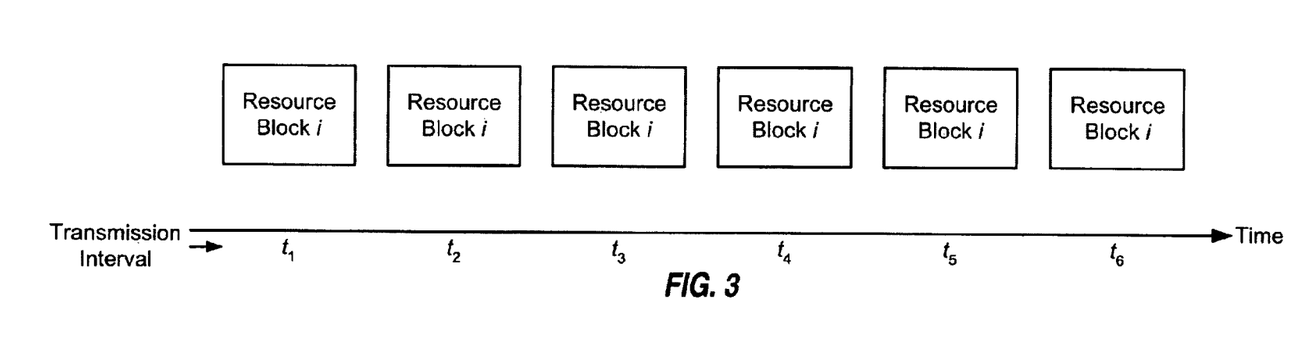
FIG. 3 shows static grouping with one resource block.

FIG. 3 shows static grouping for a case in which a UE is assigned one resource block in each transmission interval. A transmission interval may be a time interval (e.g., a subframe) in which data might be sent to the UE. A transmission interval may also be referred to as a scheduling interval, an assigned subframe, etc. The UE may be assigned one interlace, and the transmission intervals may correspond to all subframes on this interlace.

For the static grouping example shown in FIG. 3, the UE, may be assigned the same resource block i in each transmission interval. In transmission interval $t_1$, the UE may blindly decode a transmission received on resource block i to determine whether a packet has been sent to the UE. In transmission interval $t_2$, the UE may blindly decode a transmission received on resource block i to determine whether a new packet has been sent to the UE starting in transmission interval $t_2$. If a packet was not decoded correctly in transmission interval $t_1$, then the UE may also blindly decode the two transmissions received on resource block i in transmission intervals $t_1$ and $t_2$ to determine whether a packet has been sent to the UE starting in transmission interval $t_1$.

In general, without control information on the PDCCH, the UE cannot tell whether or not a packet has been sent to the UE unless and until the packet is decoded correctly. Thus, in each transmission interval, the UE may perform blind decoding for up to T hypotheses, with each hypothesis corresponding to a different transmission interval in which the first transmission of a packet might have been sent. The number of hypotheses to evaluate may be dependent on the last transmission interval in which a packet was correctly decoded and the maximum number of transmissions for each packet.

FIG. 3 shows an example in which a UE is assigned a single resource block in each transmission interval. A UE may also be assigned multiple, (R) resource blocks and may then perform blind decoding for up to R·T hypotheses in each transmission interval.

Multiple UEs may share the same static group of resource blocks. A larger group size may improve traffic statistical multiplexing gain since more UEs can share more resource blocks. However, a larger group size may increase decoding complexity since each UE would need to perform blind decoding for more resource blocks. A smaller group size may reduce decoding complexity. However, this reduction in decoding complexity may come at the expense of less statistical multiplexing gain and potentially lower capacity.

Dynamic grouping may be used to improve statistical multiplexing gain with a small group size. Dynamic grouping may also be referred to as group hopping. With group hopping, the group of resource blocks assigned to a UE may change with time in a predetermined manner.

Figure 4:
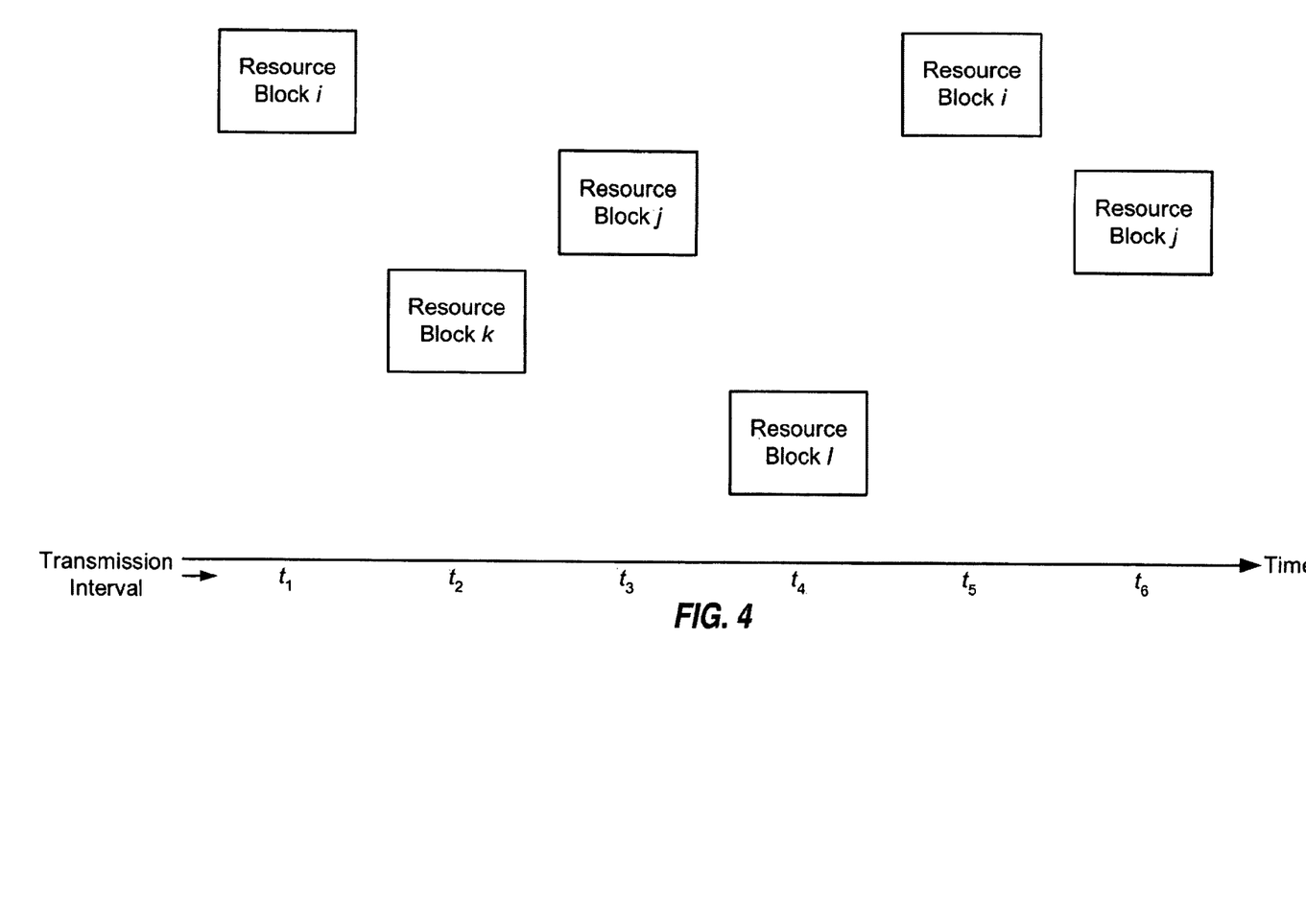
FIG. 4 shows group hopping with one resource block.

FIG. 4 shows group hopping for a case in which a UE is assigned one resource block in each transmission interval. The assigned resource block in each transmission interval may be determined based on a hopping pattern. For the example shown in FIG. 4, the UE is assigned resource block i in transmission interval $t_1$, resource block k in transmission interval $t_2$, resource block j in transmission interval $t_3$, etc. In each transmission interval, the UE may perform blind decoding for up to T hypotheses corresponding to up to T different transmission intervals in which the first transmission of a packet might have been sent.

FIG. 4 shows an example in which a UE is assigned a single resource block in each transmission interval. A UE may also be assigned multiple resource blocks and may then perform blind decoding for all hypotheses in each transmission interval.

Different UEs may be assigned resource blocks determined based on different hopping patterns. Group hopping may have higher statistical multiplexing gain than static grouping since different UEs may be assigned different resource blocks in different transmission intervals. However, if the group hopping is pseudo-random for different UEs, then two UEs may be assigned the same resource block in a given transmission interval. Packet retransmissions for these UEs may collide, and performance degradation may result.

Figure 5:
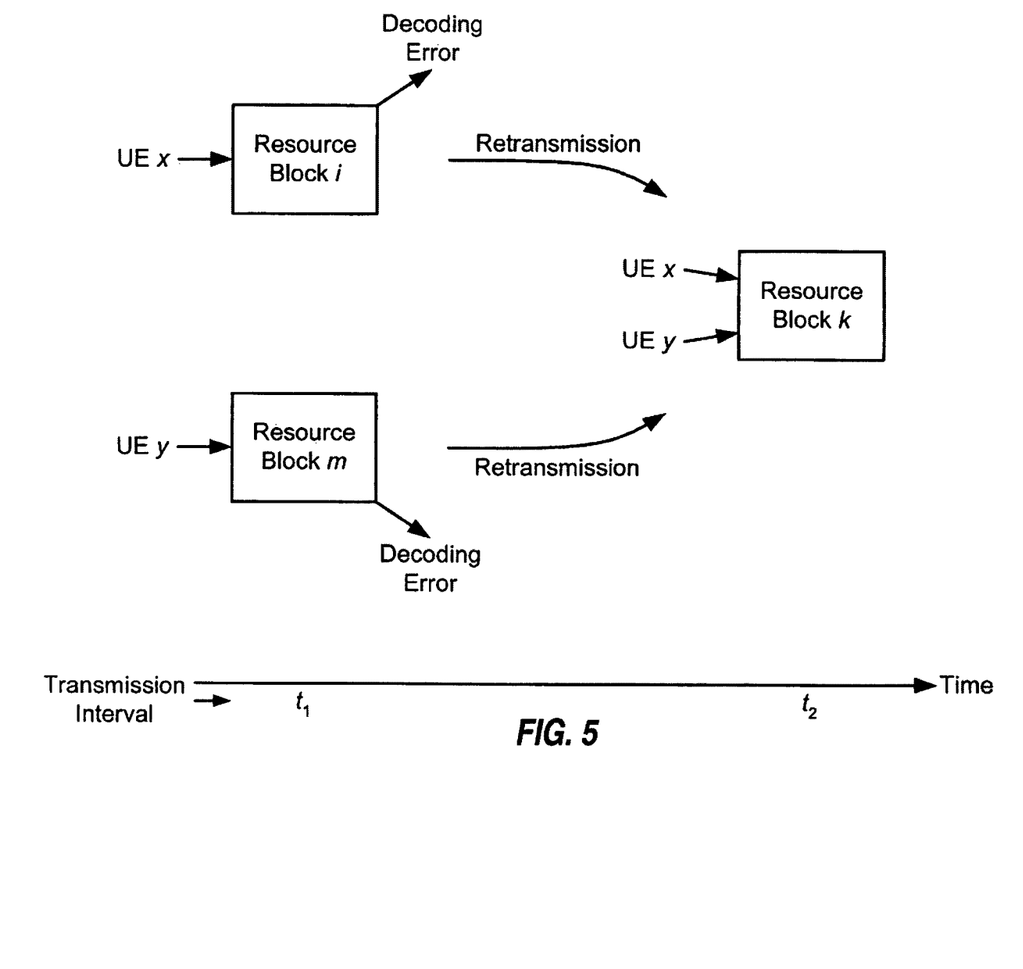
FIG. 5 shows collision due to pseudo-random group hopping.

FIG. 5 shows an example of collision due to pseudo-random group hopping for a case in which each UE is assigned one resource block in each transmission interval. In this example, UE x is assigned resource block i and UE y is assigned resource block m in transmission interval $t_1$. In transmissions interval $t_1$, a transmission of a packet may be sent to UE x on resource block i, and a transmission of another packet may be sent to UE y on resource block m. UEs x and y are both assigned the same resource block k in transmission interval $t_2$. If both UEs correctly decoded their packets in transmission interval $t_1$ and if more packets are available for these UEs, then a transmission of a new packet for one UE may be sent on resource block k in transmission interval $t_2$. A transmission of a new packet for the other UE may be delayed until a later transmission interval. If one UE correctly decoded its packet and the other UE decoded its packet in error in transmission interval $t_1$, then a retransmission of the packet decoded in error may be sent on resource block k in transmission interval $t_2$. A transmission of a new packet for the other UE may be delayed. However, if both UEs decoded their packets in error in transmission interval L, then a retransmission of only one packet may be sent on resource block k in transmission interval $t_2$. Both UEs may expect retransmissions of their packets on resource block k. One UE would erroneously decode the retransmission sent for the other UE and would not be able to correctly decode its packet, possibly even if more retransmissions are sent in future transmission intervals.

In an aspect, a hybrid scheme comprising a combination of group hopping for transmissions of new packets and static grouping for retransmissions of pending packets may be used to obtain the benefits of statistical multiplexing gain while avoiding collisions of packet retransmissions. This hybrid scheme may also be referred to as hybrid grouping, group hopping with fixed resource block for retransmissions, etc. For the hybrid scheme, a UE may be assigned different resource blocks in different transmission intervals based on a hopping pattern, e.g., as shown in FIG. 4. In each transmission interval, a transmission of a new packet may be sent to the UE on the resource block assigned to the UE. If this resource block is available, e.g., not used for retransmission to another UE. If the packet is decoded in error, then a retransmission of the packet may be sent on the same resource block in the next transmission interval. For another UE assigned this resource block a transmission of a new packet to this UE may be delayed until a later transmission interval.

Figure 6:
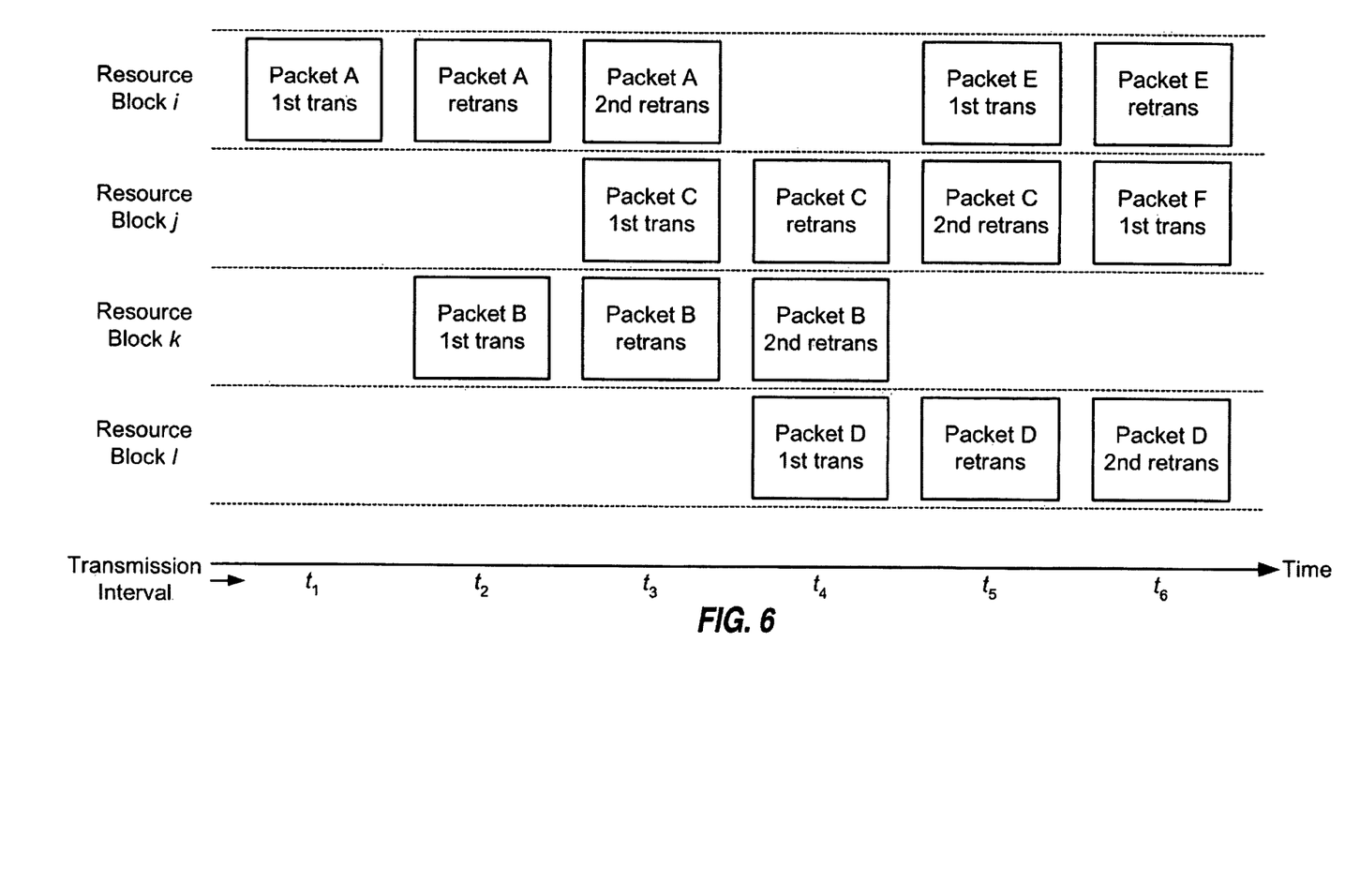
FIG. 6 shows the hybrid scheme with group hopping for new packet transmissions and static grouping for packet retransmissions.

FIG. 6 shows an example of the hybrid scheme. In this example, a UE is assigned one resource block in each transmission interval and starts monitoring in transmission interval $t_1$. The initialization may be achieved by a signaling transmission on the PDCCH or a Layer 3 signaling message.

In transmission interval $t_1$, the UE is assigned resource block i, and a first transmission of a new packet A may be sent to the UE on this resource block, if available. In transmission interval $t_2$, the UE is assigned resource block k, and a first transmission of a new packet B may be sent to the UE on this resource block, if available. If packet A is decoded in error in transmission interval $t_1$, then a retransmission of packet A may be sent on resource block i in transmission interval $t_2$. This retransmission may have higher priority than a transmission of a new packet for another UE that is assigned resource block i in transmission interval $t_2$.

In transmission interval $t_3$, the UE is assigned resource block j, and a first transmission of a new packet C may be sent to the UE on this resource block, if available. If packet A is decoded in error in transmission interval $t_2$, then a second retransmission of packet A may be sent on resource block i in transmission interval $t_3$. Similarly, if packet B is decoded in error in transmission interval $t_2$, then a retransmission of packet B may be sent on resource block k in transmission interval $t_3$.

Transmission of a new packet and retransmissions of pending packets may occur in similar manner in each subsequent transmission interval. In the example shown in FIG. 6, T=3, and up to three transmissions may be sent for each packet.

Thus, packet A would terminate in transmission interval $t_3$ regardless of whether the packet is decoded correctly or in error.

In the design shown in FIG. 6, new packets observe group hopping whereas pending packets observe static grouping. The resource block for a packet is fixed until the packet is decoded correctly or the maximum number of transmissions has been sent for the packet. All other UEs assigned this same resource block during the pendency of the packet may have their new packet transmissions delayed.

In the design shown in FIG. 6, a new packet may be started on a resource block if it is available, e.g., not used for retransmission of another packet. Hence, only one packet may be pending on each resource block at any given moment, and collisions of packet retransmissions may be avoided. New packet transmissions may be sent on resource blocks determined by group hopping. The hybrid scheme may thus be able to achieve good statistical multiplexing gain due to group hopping while avoiding packet retransmission collisions.

The design shown in FIG. 6 may not increase decoding complexity at the UE. In each transmission interval, the UE may evaluate up to T hypotheses for up to T packets that might have been sent to the UE on up to T different resource blocks. In transmission interval $t_2$, the UE may perform blind decoding for the transmission on resource block k to potentially receive a new packet. If the UE did not correctly decode a packet on resource block i in prior transmission interval $t_1$, then the UE may also perform blind decoding for the transmission on resource block i to potentially receive a pending packet. In transmission interval $t_3$, the UE may perform blind decoding for the transmission on resource block j to potentially receive a new packet. The UE may also perform blind decoding for the transmission on resource block k if the UE did not correctly decode a packet on this resource block in prior transmission interval $t_2$. Similarly, the UE may perform blind decoding for the transmission on resource block i if the UE did not correctly decode a packet on this resource block in prior transmission interval $t_2$. In general, in each transmission interval, the UE may perform blind decoding for a total of up to T hypotheses, which may include (i) one hypothesis for the transmission on the assigned resource block to potentially receive a new packet and (ii), up to T−1 hypotheses for possible retransmissions on up to T−1 other resource blocks. The UE may perform blind decoding in this manner until the end of a call. The blind decoding may also be reset by a new signaling transmission on the PDCCH or a new Layer 3 signaling message.

In the design shown in FIG. 6, up to T packets may be sent in parallel to the UE on up to T different resource blocks in a given transmission interval. In another design, at most one packet may be sent at any given time to the UE. This design may reduce the number of hypotheses to evaluate, on average, and may also improve reliability of blind decoding. If the UE correctly decodes a packet on one resource block in a given transmission interval, then the UE may skip the blind decoding for all hypotheses with earlier packet start time and may discard all information stored for these resource blocks. In addition, for the next transmission interval, the UE may perform blind decoding for just one hypothesis for a new packet transmission on the resource block assigned in this transmission interval. In general, up to M packets may be sent in parallel to the UE, where $1 \leq M \leq T$.

Hopping may be performed in various manners for the hybrid scheme. In one design, the hopping pattern may select a new resource block in each transmission interval and may avoid resource blocks used for retransmissions of pending packets. If up to M packets may be sent in parallel, then the same resource block may be selected after M or more transmission intervals have elapsed. In another design, the hopping pattern may select any resource block in each transmission interval. In this design, if a resource block used for a pending packet is selected, then any new packet transmission may be delayed to a later transmission interval.

For clarity, the hybrid scheme has been described for a case in which a UE is assigned a single resource block in each transmission interval. A UE may also be assigned multiple resource blocks in each transmission interval and may then perform blind decoding for all hypotheses in each transmission interval.

Figure 7:
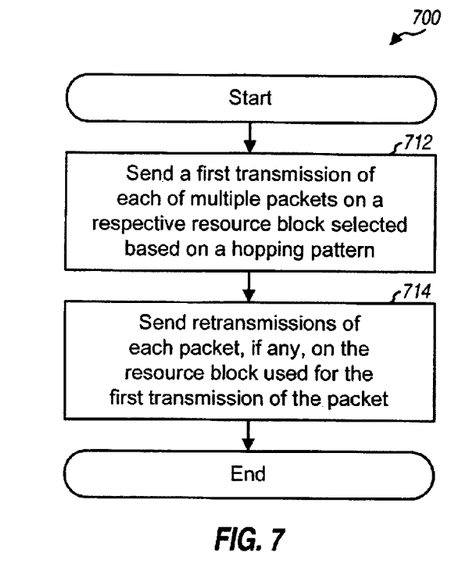
FIG. 7 shows a process for sending data based on the hybrid scheme.

FIG. 7 shows a design of a process 700 for sending data based on the hybrid scheme. Process 700 may be performed by a transmitter, e.g., a Node B, a UE, or some other entity. A first transmission of each of multiple packets may be sent on a respective resource block selected based on a hopping pattern (block 712). The hopping pattern may be a pseudo-random pattern or a predetermined pattern. The packets may be for VoIP, multi-media, or some other application. Retransmissions of each packet, if any, may be sent on the resource block used for the first transmission of the packet (block 714).

For block 712, in each transmission interval, a resource block may be selected from among a plurality of resource blocks based on the hopping pattern. Whether the resource block is available may be determined based on whether a retransmission of a pending packet is being sent on this resource block. The first transmission of a new packet may be sent on the resource block if available. For block 714, up to a maximum number of retransmissions may be sent for each packet. The resource block used for the first transmission of each packet may be reserved until all retransmissions of the packet have been sent.

Up to M packets may be sent in parallel on up to M resource blocks in a transmission interval, where M may be one or greater. In a first transmission interval, a first resource block may be selected based on the hopping pattern, and the first transmission of a first packet may be sent on this resource block. In a second transmission interval, a second resource block may be selected based on the hopping pattern, the first transmission of a second packet may be sent on this resource block, and a retransmission of the first packet may be sent on the first resource block if needed. In a third transmission interval, a third resource block may be selected based on the hopping pattern, the first transmission of a third packet may be sent on the third resource block, a retransmission of the second packet may be sent on the second resource block if needed, and another retransmission of the first packet may be sent on the first resource block if needed.

Figure 8:
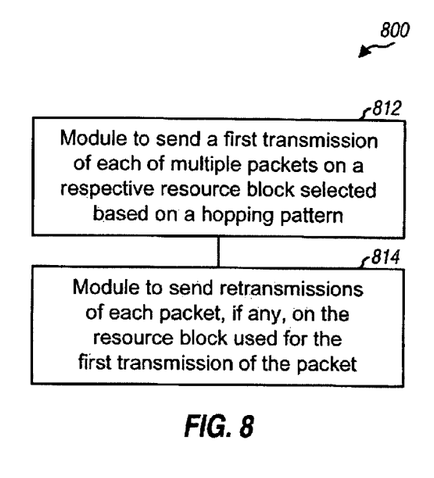
FIG. 8 shows an apparatus for sending data based on the hybrid scheme.

FIG. 8 shows a design of an apparatus 800 for sending data based on the hybrid scheme. Apparatus 800 includes means for sending a first transmission of each of multiple packets on a respective resource block selected based on a hopping pattern (module 812), and means for sending retransmissions of each packet, if any, on the resource block used for the first transmission of the packet (module 814).

Figure 9:
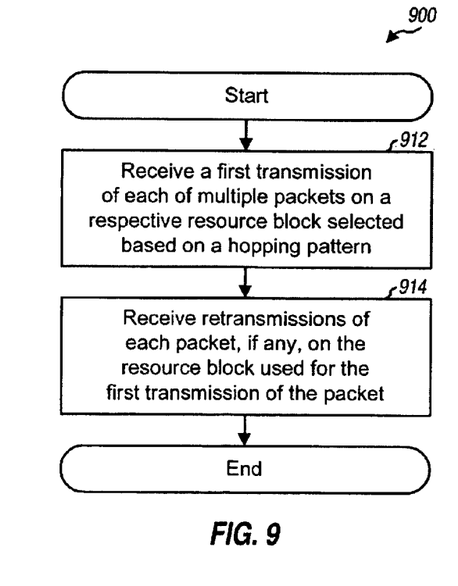
FIG. 9 shows a process for receiving data based on the hybrid scheme.

FIG. 9 shows a design of a process 900 for receiving data based on the hybrid scheme. Process 900 may be performed by a receiver, e.g., a UE, a Node B, or some other entity. A first transmission of each of multiple packets may be received on a respective resource block selected based on a hopping pattern (block 912). Retransmissions of each packet, if any, may be received on the resource block used for the first transmission of the packet (block 914).

For block 912, in each transmission interval, a resource block may be selected from among, a plurality of resource blocks based on the hopping pattern, and blind decoding may be performed for a possible first transmission of a new packet on this resource block. For block 914, in each transmission interval, blind decoding may be performed for a possible retransmission of each pending packet on the resource block used for the first transmission of that packet.

Up to M packets may be received in parallel on up to M resource blocks in a transmission interval, where M is one or greater. In a first transmission interval, the first transmission of a first packet may be received on a first resource block, and blind decoding may be performed for the first packet. In a second transmission interval, the first transmission of a second packet may be received on a second resource block, and blind decoding may be performed for the second packet. If the first packet is decoded in error in the first transmission interval, then a retransmission of the first packet may be received on the first resource block in the second transmission interval, and blind decoding may be performed for the first packet. In a third transmission interval, the first transmission of a third packet may be received on a third resource block, and blind decoding may be performed for the third packet. If the second packet is decoded in error in the second transmission interval, then a retransmission of the second packet may be received on the second resource block in the third transmission interval, and blind decoding may be performed for the second packet. If the first packet is decoded in error in the second transmission interval, then another retransmission of the first packet may be received on the first resource block in the third transmission interval, and blind decoding may be performed for the first packet.

Figure 10:
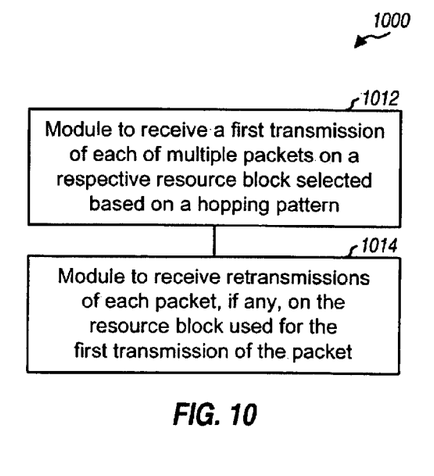
FIG. 10 shows an apparatus for receiving data based on the hybrid scheme.

FIG. 10 shows a design of an apparatus 1000 for receiving data based on the hybrid scheme. Apparatus 1000 includes means for receiving a first transmission of each of multiple packets on a respective resource block selected based on a hopping pattern (module 1012), and means for receiving retransmissions of each packet, if any, on the resource block used for the first transmission of the packet (module 1014).

In another aspect, semi-static group assignment may be used to improve performance. With semi-static group assignment, a UE may be assigned a group of resource blocks that may change periodically or based on trigger events. In general, a resource group may include any number of resource blocks and may be conveyed via a signaling transmission on the PDCCH or a Layer 3 signaling message. The group assignment may change in different assignment intervals. An assignment interval is a time duration in which an assignment of a group of resource blocks is valid. The assignment intervals may have fixed or variable durations.

Semi-static group assignment may be used for various grouping schemes. In one design, semi-static group assignment may be used with static grouping and may be referred to as semi-static grouping. With semi-static grouping, the assigned resource block(s) are static over the assignment interval, similar to static grouping, and different groups of static resource blocks may be assigned in different assignment intervals. Semi-static grouping may improve statistical multiplexing gain over static grouping while avoiding packet retransmission collisions. In another design, semi-static group assignment may be used with dynamic grouping. In yet another design, semi-static group assignment may be used with hybrid grouping. For both dynamic and hybrid groupings, the assigned resource block(s) may vary dynamically within an assignment interval, similar to dynamic grouping, and different resource groups and/or different hopping patterns may be assigned in different assignment intervals.

Semi-static group assignment may be used to update UE group association for all grouping schemes. In one design, multiple groups of resource blocks may be defined, and UEs may be assigned appropriate resource groups based on various factors such as amount of data to send to the UEs, data requirements of the UEs, etc. For example, queuing delays of all UEs assigned a given resource group may be monitored. If the average queuing delay is large enough, e.g., relative to a delay budget, then one or more UEs may be assigned another resource group that is less congested, and a new group assignment may be sent to each affected UE. The UEs may thus be flexibly assigned new resource groups to balance load, improve delay and quality of service (QoS), and possibly obtain other benefits.

In another design, a UE may be assigned a group of resource blocks of varying size based on data requirements of the UE. For example, the queue size of the UE may be monitored. If the queue size is large, e.g., larger than a high threshold, then the UE may be assigned a larger resource group. Conversely, if the queue size is small, e.g., smaller than a low threshold, then the UE may be assigned a smaller resource group. A new group assignment may be sent to the UE whenever there is a change in resource group.

Figure 11:
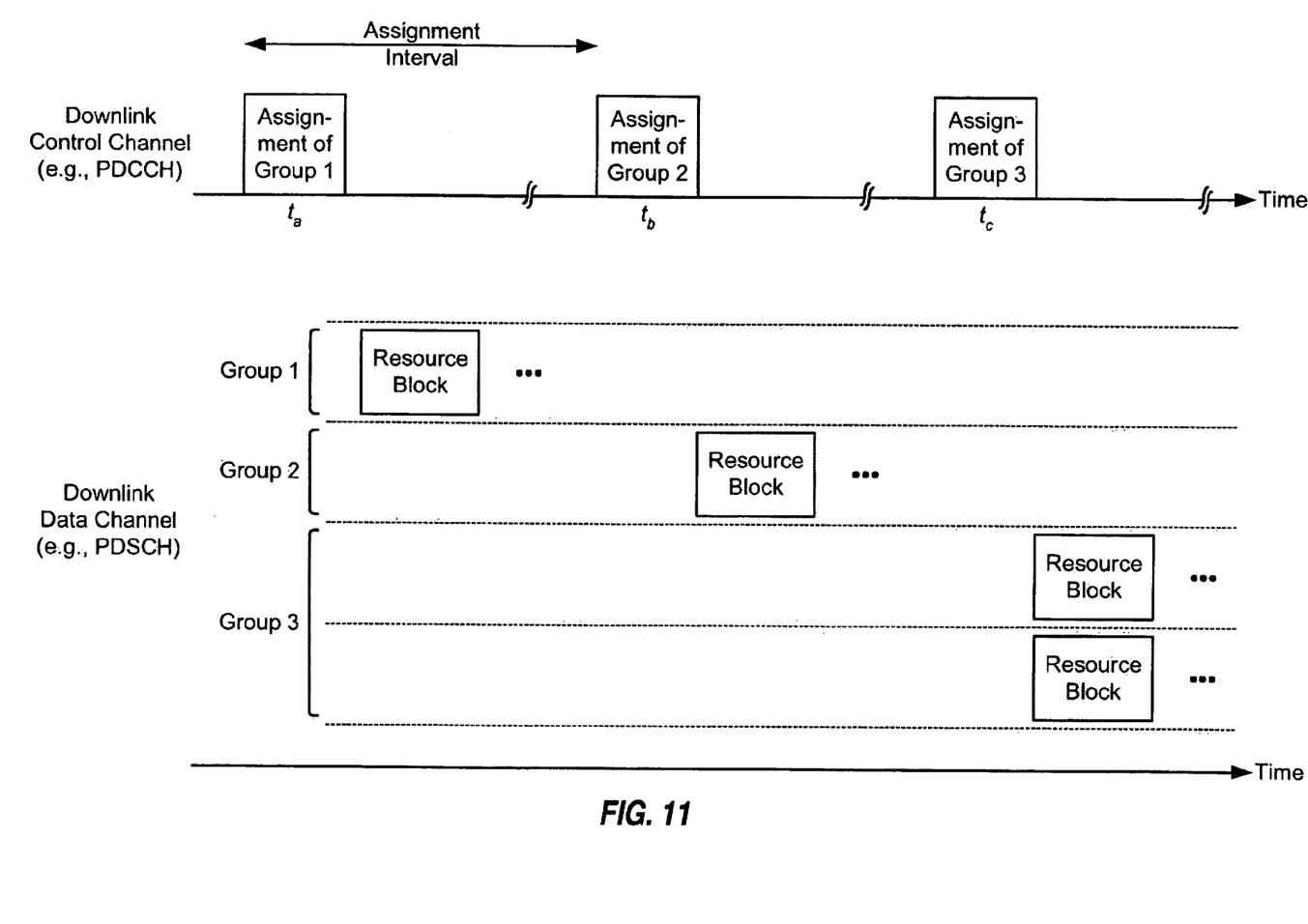
FIG. 11 shows semi-static group assignment.

FIG. 11 shows an example of semi-static group assignment. In this example, a UE is initially assigned resource group 1 having one resource block, and an assignment of group 1 is sent to the UE at time $t_a$. The UE may thereafter monitor the resource block in group 1. At time $t_b$, the UE is assigned resource group 2 having one resource block, e.g., to relieve congestion on group 1. An assignment of group 2 is sent to the UE at time $t_b$, and the UE may thereafter monitor the resource block in group 2. At time $t_c$, the UE is assigned resource group 3 having two resource blocks, e.g., due to a larger queue for the UE. An assignment of group 3 is sent to the UE At time $t_c$, and the UE may thereafter monitor the two resource blocks in group 3.

In general, new group assignments may be triggered by traffic statistical multiplexing conditions, data requirements, etc., and may be sent on a relatively infrequent basis. Semi-static group assignment may allow for flexible tradeoff between signaling overhead, UE complexity, and statistical multiplexing gain.

Figures 12, 13:
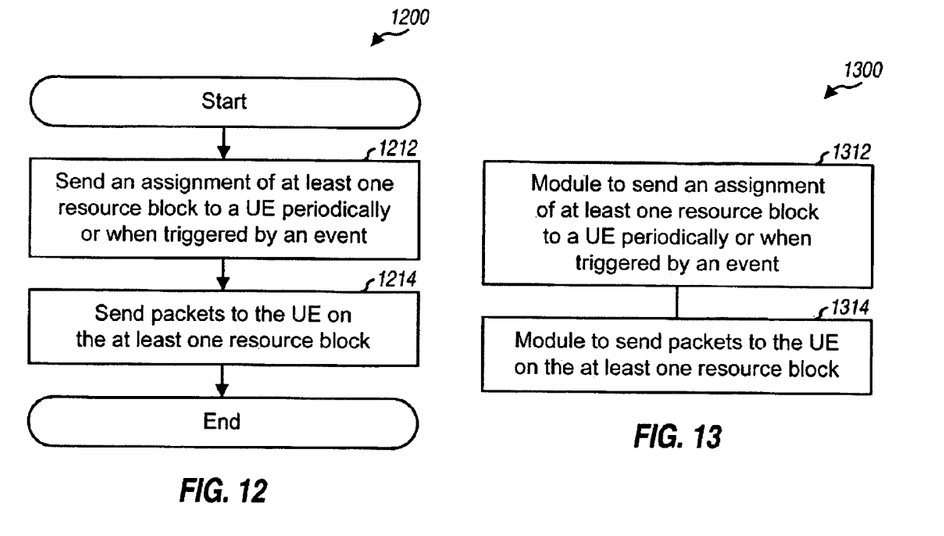
FIG. 12 shows a process for sending data with semi-static group assignment.
FIG. 13 shows an apparatus for sending data with semi-static group assignment.

FIG. 12 shows a design of a process 1200 for sending data with semi-static group assignment. Process 1200 may be performed by a Node B or some other entity. An assignment of at least one resource block may be sent to a UE periodically or when triggered by an event (block 1212). Packets may be sent to the UE on the at least one resource block (block 1214). In one design, the at least one resource block may be static, and all transmissions of each packet may be sent on one resource block. In another design, the at least one resource block may be determined based on a hopping pattern. The first transmission of each packet may be sent on a respective resource block selected based on the hopping pattern, and all retransmissions of each packet may be sent on the resource block used for the first transmission of the packet.

A new assignment may be triggered based on loading on the currently assigned resource block(s), data requirements of the UE, whether hopping is used for the assigned resource block(s), etc. Different numbers of resource blocks may be assigned to the UE in different time/assignment intervals. The UE may also be associated with different groups of UEs in different time intervals, e.g., to improve statistical multiplexing gain.

FIG. 13 shows a design of an apparatus 1300 for sending data with semi-static group assignment. Apparatus 1300 includes means for sending an assignment of at least one resource block to a UE periodically or when triggered by an event (module 1312), and means for sending packets to the UE on the at least one resource block (module 1314).

Figures 14, 15:
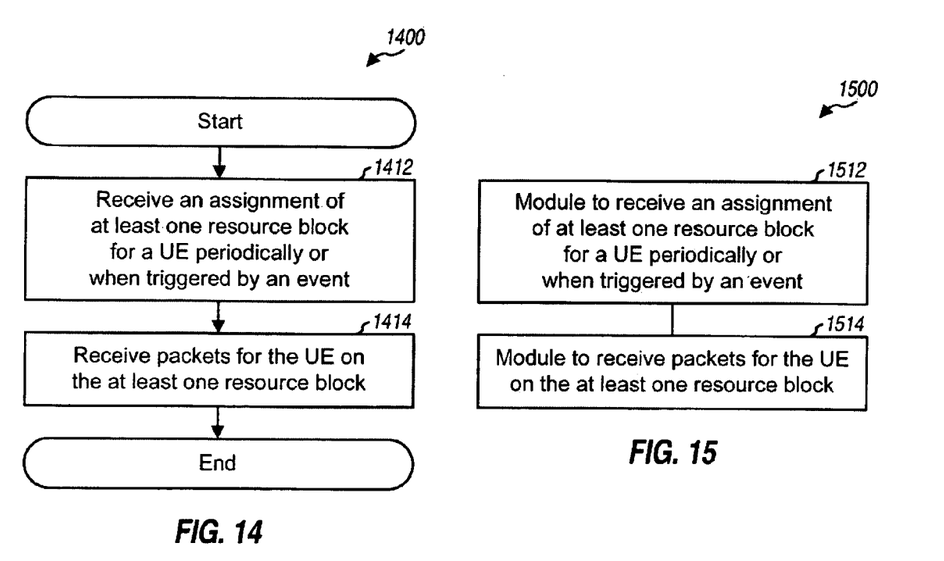
FIG. 14 shows a process for receiving-data with semi-static group assignment.
FIG. 15 shows an apparatus for receiving data with semi-static group assignment.

FIG. 14 shows a design of a process 1400 for receiving data with semi-static group assignment. Process 1400 may be performed by a UE or some other entity. An assignment of at least one resource block for the UE may be received periodically or when triggered by an event (block 1412). Packets for the UE may be received on the at least one resource block (block 1414). In one design, the at least one resource block may be static, and all transmissions of each packet may be received on one resource block. In another design, the at least one resource block may be determined based on a hopping pattern. The first transmission of each packet may be received on a respective resource block selected based on the hopping pattern, and all retransmissions of each packet may be received on the resource block used for the first transmission of the packet. In each transmission interval, blind decoding may be performed for a new packet and for each pending packet based on the transmission and retransmissions received on the at least one resource block.

FIG. 15 shows a design of an apparatus 1500 for receiving data with semi-static group assignment. Apparatus 1500 includes means for receiving an assignment of at least one resource block for a UE periodically or when triggered by an event (module 1512), and means for receiving packets for the UE on the at least one resource block (module 1514).

The modules in FIGS. 8, 10, 13 and 15 may comprise processors, electronics devices, hardware devices, electronics components, logical circuits, memories, etc., or any combination thereof.

Figure 16:
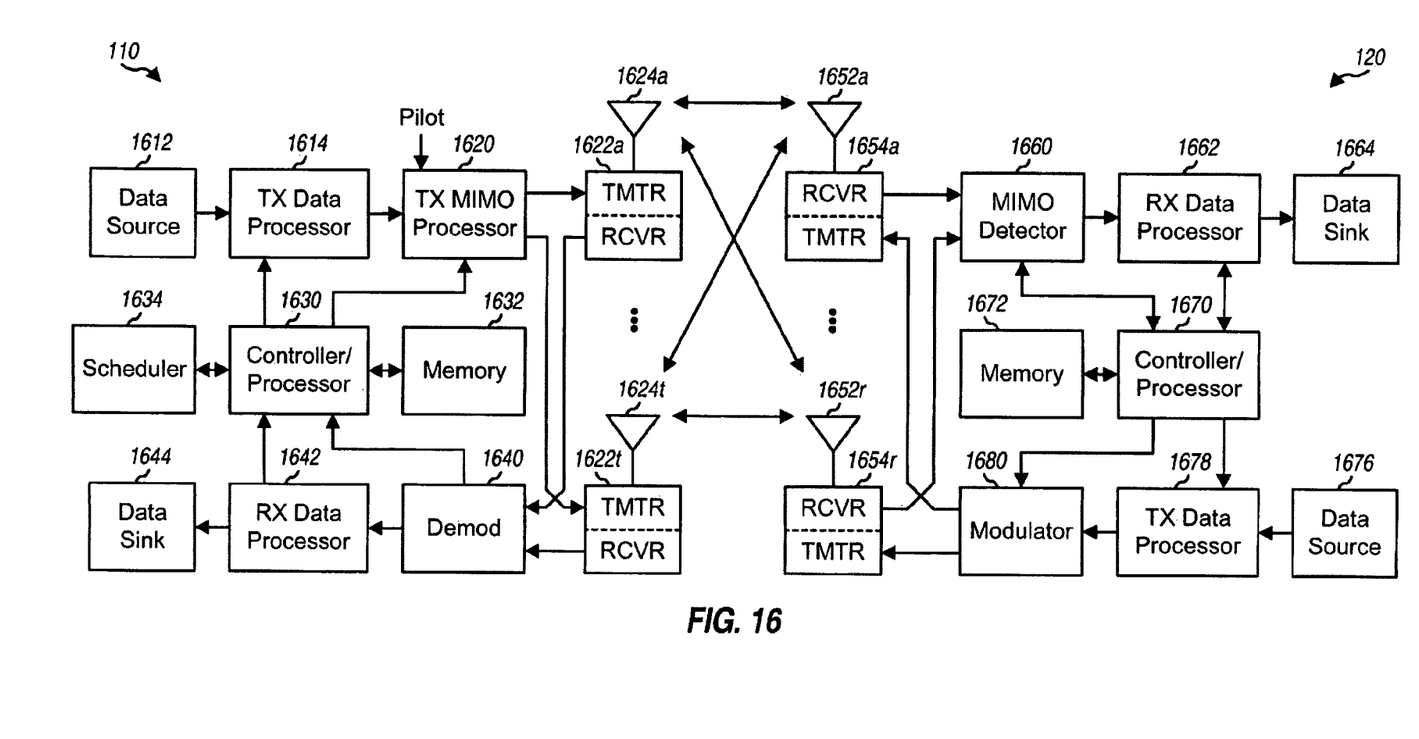
FIG. 16 shows a block diagram of a Node B and a UE.

FIG. 16 shows a block diagram of a design of Node B 110 and UE 120, which are one of the Node Bs and one of the UEs in FIG. 1. At Node B 110, a transmit (TX) data processor 1614 may receive traffic data for one or more UEs from a data source 1612. TX data processor 1614 may process (e.g., encode, interleave, and symbol map) the traffic data for each UE to obtain data symbols. TX data processor 1614 may also process signaling (e.g., assignments) for the UEs to obtain signaling symbols.

A TX MIMO processor 1620 may multiplex the data and signaling symbols for all UEs with pilot symbols. TX MIMO processor 1620 may process (e.g., precode) the multiplexed symbols and provide T output symbol streams to T transmitters (TMTR) 1622a through 1622t. Each transmitter 1622 may process a respective output symbol stream (e.g., for OFDM) to obtain an output chip stream. Each transmitter 1622 may further process (e.g., convert to analog, amplify, filter, and upconvert) the output chip stream to obtain a downlink signal. T downlink signals from transmitter 1622a through 1622t may be transmitted via T antennas 1624a through 1624t, respectively.

At UE 120, antennas 1652a through 1652r may receive the downlink signals from Node B 110 and provide received signals to receivers (RCVR) 1654a through 1654r, respectively. Each receiver 1654 may condition (e.g., filter, amplify, downconvert, and digitize) a respective received signal to obtain samples and may further process the samples (e.g., for OFDM) to obtain received symbols. A MIMO detector 1660 may process the received symbols from receivers 1654a through 1654r based on a MIMO receiver processing technique to obtain detected symbols. A receive (RX) data processor 1662 may then process (e.g., demodulate, deinterleave, and decode) the detected symbols, provide decoded data for UE 120 to a data sink 1664, and provide decoded signaling to a controller/processor 1670.

On the uplink, at UE 120, traffic data from a data source 1676 and signaling from controller/processor 1670 may be processed by a TX data processor 1678, further processed by a modulator 1680, conditioned by transmitters 1654a through 1654r, and transmitted to Node B 110. At Node B 110, the uplink signals from UE 120 may be received by antennas 1624, conditioned by receivers 1622, demodulated by a demodulator (Demod) 1640, and processed by an RX data processor 1642 to obtain the traffic data and signaling transmitted by UE 120.

Controllers/processors 1630 and 1670 may direct the operation at Node B 110 and UE 120, respectively. Controller/processor 1630 may perform process 700 in FIG. 7, process 1200 in FIG. 12, and/or other processes for the techniques described herein. Controller/processor 1670 may perform process 900 in FIG. 9, process 1400 in FIG. 14, and/or other processes for the techniques described herein. Memories 1632 and 1672 may store data and program codes for Node B 110 and UE 120, respectively. A scheduler 1634 may schedule UEs for downlink and/or uplink transmission and may provide assignments of resource blocks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM, memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
    at least one processor configured to send a first transmission of each packet of multiple packets on a frequency selected for the packet from among a plurality of available frequencies based on a pattern, wherein different frequencies are selected for the multiple packets based on the pattern, and to send retransmissions of each packet, if any, on the frequency used for the first transmission of the packet and during a different transmission interval used for the first transmission of the packet; and
    a memory coupled to the at least one processor.

2. The apparatus of claim 1, wherein the at least one processor is configured to determine whether the frequency is available based on whether a retransmission of a pending packet is being sent on the frequency, and to send the first transmission of a new packet on the frequency if available.

3. The apparatus of claim 1, wherein the at least one processor is configured to send up to a maximum number of retransmissions for each packet, and to reserve the frequency used for the first transmission of each packet until all retransmissions of the packet have been sent.

4. The apparatus of claim 1, wherein the at least one processor is configured to send up to M packets in parallel on up to M frequencies in a transmission interval, where M is one or greater.

5. The apparatus of claim 1, wherein the multiple packets comprise first and second packets, and wherein the at least one processor is configured to select a first frequency based on the pattern in a first transmission interval, to send the first transmission of the first packet on the first frequency in the first transmission interval, to select a second frequency based on the pattern in a second transmission interval, to send the first transmission of the second packet on the second frequency in the second transmission interval, and to send a retransmission of the first packet, if needed, on the first frequency in the second transmission interval.

6. The apparatus of claim 5, wherein the multiple packets further comprise a third packet, and wherein the at least one processor is configured to select a third frequency based on the pattern in a third transmission interval, to send the first transmission of the third packet on the third frequency in the third transmission interval, to send another retransmission of the first packet, if needed, on the first frequency in the third transmission interval, and to send a retransmission of the second packet, if needed, on the second frequency in the third transmission interval.

7. A method for wireless communication, comprising:
    sending a first transmission of each packet of multiple packets on a frequency selected for the packet from among a plurality of available frequencies based on a pattern, wherein different frequencies are selected for the multiple packets based on the pattern; and
    sending retransmissions of each packet, if any, on the frequency used for the first transmission of the packet and during a different transmission interval used for the first transmission of the packet.

8. The method of claim 7, wherein the sending the first transmission comprises:
    determining whether the frequency is available based on whether a retransmission of a pending packet is being sent on the frequency, and
    sending the first transmission of a new packet on the frequency if available.

9. The method of claim 7, wherein the sending retransmissions comprises
    sending up to a maximum number of retransmissions for each packet, and
    reserving the frequency used for the first transmission of each packet until all retransmissions of the packet have been sent.

10. An apparatus for wireless communication, comprising:
    means for sending a first transmission of each packet of multiple packets on a frequency selected for the packet from among a plurality of available frequencies based on a pattern, wherein different frequencies are selected for the multiple packets based on the pattern; and
    means for sending retransmissions of each packet, if any, on the frequency used for the first transmission of the packet and during a different transmission interval used for the first transmission of the packet.

11. The apparatus of claim 10, wherein the means for sending the first transmission comprises:
    means for determining whether the frequency is available based on whether a retransmission of a pending packet is being sent on the frequency, and means for sending the first transmission of a new packet on the frequency if available.

12. The apparatus of claim 10, wherein the means for sending retransmissions comprises
means for sending up to a maximum number of retransmissions for each packet, and
means for reserving the frequency used for the first transmission of each packet until all retransmissions of the packet have been sent.

13. A non-transitory machine-readable medium comprising instructions which, when executed by a machine, cause the machine to perform operations including:
sending a first transmission of each packet of multiple packets on a frequency selected for the packet from among a plurality of available frequencies based on a pattern, wherein different frequencies are selected for the multiple packets based on the pattern; and
sending retransmissions of each packet, if any, on the frequency used for the first transmission of the packet and during a different transmission interval used for the first transmission of the packet.

14. An apparatus for wireless communication, comprising:
at least one processor configured to receive a first transmission of each packet of multiple packets on a frequency selected for the packet from among a plurality of available frequencies based on a pattern, wherein different frequencies are selected for the multiple packets based on the pattern, and to receive retransmissions of each packet, if any, on the frequency used for the first transmission of the packet and during a different transmission interval used for the first transmission of the packet; and
a memory coupled to the at least one processor.

15. The apparatus of claim 14, wherein the at least one processor is configured to select a frequency from among the plurality of available frequencies based on the pattern, and to perform blind decoding for the first transmission of a new packet received on the frequency.

16. The apparatus of claim 15, wherein the at least one processor is configured to perform blind decoding for a retransmission of a pending packet, if any, received on the frequency used for the first transmission of the pending packet.

17. The apparatus of claim 14, wherein the at least one processor is configured to receive transmissions for up to M packets on up to M frequencies in a transmission interval, where M is one or greater, and to perform blind decoding for each packet.

18. The apparatus of claim 14, wherein the multiple packets comprise a first packet, and wherein the at least one processor is configured to receive the first transmission of the first packet on a first frequency in a first transmission interval, and to perform blind decoding for the first packet.

19. The apparatus of claim 18, wherein the multiple packets further comprise a second packet, and wherein the at least one processor is configured to receive the first transmission of the second packet on a second frequency in a second transmission interval, to perform blind decoding for the second packet, and to receive a retransmission of the first packet on the first frequency and to perform blind decoding for the first packet in the second transmission interval if the first packet is decoded in error in the first transmission interval.

20. The apparatus of claim 19, wherein the multiple packets further comprise a third packet, and wherein the at least one processor is configured to receive the first transmission of the third packet on a third frequency in a third transmission interval, to perform blind decoding for the third packet, to receive a retransmission of the second packet on the second frequency and to perform blind decoding for the second packet in the third transmission interval if the second packet is decoded in error in the second transmission interval, and to receive another retransmission of the first packet on the first frequency and to perform blind decoding for the first packet in the third transmission interval if the first packet is decoded in error in the second transmission interval.

21. A method for wireless communication, comprising:
receiving a first transmission of each packet of multiple packets on a frequency selected for the packet from among a plurality of available frequencies based on a pattern, wherein different frequencies are selected for the multiple packets based on the pattern; and
receiving retransmissions of each packet, if any, on the frequency used for the first transmission of the packet and during a different transmission interval used for the first transmission of the packet.

22. The method of claim 21, further comprising:
selecting a frequency from among the plurality of available frequencies based on the pattern; and
performing blind decoding for the first transmission of a new packet received on the frequency.

23. The method of claim 21, further comprising:
performing blind decoding for a retransmission of a pending packet, if any, received on the frequency used for the first transmission of the pending packet.

24. An apparatus for wireless communication, comprising:
at least one processor configured to send an assignment of at least one frequency to a user equipment (UE) periodically or when triggered by an event, to send a first transmission of a packet on a frequency selected for the packet from among the at least one frequency based on a pattern, and to send retransmissions of the packet, if any, on the frequency used for the first transmission of the packet and during a different transmission interval used for the first transmission of the packet; and
a memory coupled to the at least one processor.

25. The apparatus of claim 24, wherein the at least one processor is configured to send the assignment of the at least one frequency when triggered based on loading on the at least one frequency, or data requirements of the first UE.

26. The apparatus of claim 24, wherein the at least one frequency is statically assigned to the first UE.

27. The apparatus of claim 24, wherein the at least one processor is configured to assign different numbers of frequencies to the first UE in different time intervals.

28. The apparatus of claim 24, wherein the at least one processor is configured to associate the first UE with different groups of UEs in different time intervals.

29. A method for wireless communication, comprising:
sending an assignment of at least one frequency to a user equipment (UE) periodically or when triggered by an event;
sending a first transmission of a packet on a frequency selected for the packet from among the at least one frequency based on a pattern; and
sending retransmissions of the packet, if any, on the frequency used for the first transmission of the packet and during a different transmission interval used for the first transmission of the packet.

30. The method of claim 29, wherein the at least one frequency is statically assigned to the UE.

31. An apparatus for wireless communication, comprising:
at least one processor configured to receive an assignment of at least one frequency for a user equipment (UE) periodically or when triggered by an event, to receive a first transmission of a packet on a frequency selected for the packet from among the at least one frequency based on a pattern, and to receive retransmissions of the packet, if any, on the frequency used for the first transmission of the packet and during a different transmission interval used for the first transmission of the packet; and a memory coupled to the at least one processor.

32. The apparatus of claim 31, wherein the at least one frequency is statically assigned to the first UE.

33. A method for wireless communication, comprising:

receiving an assignment of at least one frequency for a user equipment (UE) periodically or when triggered by an event;

receiving a first transmission of a packet on a frequency selected for the packet from among the at least one frequency based on a pattern; and receiving retransmissions of the packet, if any, on the frequency used for the first transmission of the packet and during a different transmission interval used for the first transmission of the packet.

34. The method of claim 33, wherein the at least one frequency is statically assigned to the first UE.

* * * * *